Patented Apr. 3, 1951

2,547,141

UNITED STATES PATENT OFFICE 2,547,141

ALKYL CELLULOSE STABILIZED WITH HYDROQUINONE

John Henry Sharphouse, Urmston, near Manchester, and John Downing, Spondon, near Derby, England, assignors, by mesne assignments, to Celanese Corporation of America, a corporation of Delaware No Drawing. Original application October 13, 1944, Serial No. 558,616. Divided and this application September 24, 1946, Serial No. 699,090. In Great Britain November 22, 1943

3 Claims. (Cl. 106—189)

This invention is concerned with improvements in or relating to the production of cellulose ethers and particularly in the production of cellulose ethers having an improved stability. The present application is a divisional application from our application S. No. 558,616, filed October 13, 1944, Patent No. 2,425,351.

In the production or use of articles made of or containing cellulose ethers the cellulose ethers may be subjected to high temperatures. This may be the case for example in the production of articles from moulding compositions containing cellulose ethers, and also when they are employed as the basis of coatings and as insulating materials for electrical conductors, condensers and the like. Under such conditions, particularly in the presence of air, it has been found that the viscosity of the cellulose ethers frequently falls considerably and that this fall in viscosity is accompanied by deterioration in other properties of the ethers. For example the strength of the articles may be reduced and they may become brittle. This may occur even on storage in the presence of air.

It has now been discovered that the stability of cellulose ethers may be considerably improved by incorporating in them small proportions of organic compounds containing hydroxy groups.

The organic compounds which have been found to be suitable are aromatic dihydroxy compounds, particularly p-hydroxy compounds, and other aromatic polyhydroxy compounds.

The compound which has been found particularly valuable for improving the stability of cellulose ethers is hydroquinone but other compounds which may be employed include phloroglucinol, and pyrogallol.

In most cases it is desirable to employ compounds which are substantially colourless and do not colour the cellulose ethers, at least to any great extent, after a heat treatment, and from this point of view hydroquinone is very suitable.

The cellulose ethers which are at present of the greatest importance are the ethers, particularly ethyl cellulose and other alkyl celluloses containing up to six carbon atoms in the alkyl radicles, which are soluble in hydrophobe organic solvents, and it is with the stabilisation of such ethers that the present invention is particularly concerned. Such ethers usually contain more than two ether radicles per $C_6H_{10}O_5$ unit of cellulose, for example 2.5, 2.8 or even more, and are soluble in benzene or toluene, either alone or when mixed with an alcohol, particularly ethyl alcohol.

The incorporation with the cellulose ether of the aromatic dihydroxy compound used as stabilising agent may be effected by forming a solution containing both the ether and the stabilising agent. When the ether is prepared in solution as, for example, when ethyl cellulose is produced in the presence of a large excess of ethyl chloride which acts both as an etherifying agent and also as solvent, or when it is produced using diethyl sulphate in the presence of toluene as a solvent, the incorporation of the stabilising agent may, if it is soluble in the solution, be effected before separation of the ether from the etherification solution. Usually, however, it is preferable to carry out the incorporation of the stabilising agent with the ether in an operation separate from that of the production of the ether. For example, after the ether has been separated from the etherification medium and washed, it may be dissolved in a suitable solvent and then either the stabilising agent may be dissolved in the solution or a solution of the stabilising agent may be mixed with the cellulose ether solution. After thorough mixing of the stabilising agent with the cellulose ether in solution, the mixture of ether and stabilising agent may be precipitated by mixing the solution with a suitable non-solvent for the ether. Preferably the liquid employed is a non-solvent also for the stabilising agent, though even if the liquid has some solvent action on the stabilising agent the ether usually carries down with it some of the stabilising agent. In such circumstances, however, it is of course necessary in deciding how much stabilising agent is to be incorporated with the cellulose ether solution to take into account the amount which remains in solution after precipitation of the ether.

Incorporation of the stabilising agent with the ether may also be effected by treating the ether in solid form with a solution of the agent. For example, the ether may be suspended in 50 or 100 times its weight of an aqueous or aqueous-alcoholic solution of hydroquinone or other stabilising agent, containing 1 or 5 or even 10% of agent based on the weight of the ether, and boiled for 30 minutes to 1 hour, or allowed to stand at atmospheric temperature for a longer period, e. g. 2 hours, after which it is filtered off, washed, preferably with distilled water, and dried at 95–100° C. Again, the ether may be mixed for 1 or 2 hours with a solution of a stabilising agent in an organic liquid which has a swelling action on the ether, after which the liquid is removed and the ether dried. Removal may be effected by decantation, followed by drying off the ether at a temperature below that at which the liquid tends to soften the ether too much and make it sticky. Alternatively, if the liquid has little swelling action it may be removed by pressure, e. g. in a centrifuge, and the ether then dried as described above. A further method of removing residual liquid consists in washing the ether with a liquid which is a solvent for the liquid employed for impregnation and a non-solvent for the ether and the stabilising agent. Incorporation of the stabilising agent with the ether in suspension has the advantage that it avoids the expense in time and materials involved in dissolving and precipitating the ether.

The incorporation of the stabilising agent with the ether may be effected in a stage during its conversion into an industrial article, e. g. a filament, foil or moulded article. For instance, the stabiliser may be incorporated with an ether simultaneously with the incorporation of a plasticiser during the production of a moulding composition. Thus the ether, plasticiser and stabilising agent may be dissolved in a common solvent which is subsequently removed, or the ether and plasticiser may be dispersed in water or other non-solvent in which the stabilising agent is dissolved and the non-solvent then driven off. According to another method the ether, plasticising agent and stabilising agent may be dissolved at a super-atmospheric temperature in a liquid which is a non-solvent for the ether at atmospheric temperature, and the solution then cooled so that the ether separates out, after having absorbed plasticiser and stabilising agent.

Again a cellulose ether and a stabilising agent may be dissolved in a solvent liquid and the solution formed employed for the manufacture of filaments, foils and the like by dry- or wet-spinning processes, or as a coating composition.

Up to a point the degree of stabilisation obtained increases with increase in the proportion of stabilising agent to ether, but the optimum proportion will vary, for example with the degree of impurity of the ether and with the molecular weight and activity of the stabilising agent. Usually it is not necessary to use more than 2% or 5% of stabilising agent based on the weight of the cellulose ether, though in some cases proportions as high as 8 or even 10% may be employed. In some cases lower proportions of agent can be employed. For example, in stabilising a certain batch of ethyl cellulose with hydroquinone, both substances being in solution in a mixture of benzene and methylated spirit, it was found that as the proportion of hydroquinone to ether in the solution was increased from 0.1% to 0.5% and then to 1%, so the degree of stabilisation increased from about 35% to 100%, though when the proportion was further increased to 5% the degree of stabilisation dropped to about 93%. In another case, however, using hydroquinone, an increase from 1% to 5% increased the degree of stability. As a rule the best proportion of stabiliser to ether is from 1 to 5%.

Some of the stabilising agents yield coloured compounds when oxidised and if this occurs in the present process not only are they no longer available to act as stabilising agents in the cellulose ether, but also their colour may affect the value of the cellulose ether for certain purposes. Usually this oxidation process takes place most rapidly in an alkaline medium and in order to reduce the development of colour as far as possible it is desirable in any aqueous treatments of the cellulose ether, after incorporation of the stabilising agent with the ether, for example separation of the ether from the liquid employed for incorporating the stabiliser, to use a neutral or even slightly acid aqueous treatment medium. For example if the cellulose ether and stabiliser are precipitated from solution and washed by means of water it is desirable to use distilled water or water which has been treated to give it a pH value of 7 or slightly less.

The process of the present invention is illustrated by the following examples, which describe methods of improving the stability to heat of different samples of ethyl cellulose. The ethyl celluloses used were of the type soluble in mixtures containing 80% of benzene and 20% methylated spirit by volume, and their viscosities were determined from the rate of flow of 5% solutions in this solvent mixture. The figures for the stabilities of the ethyl celluloses represent the viscosity of a 5% solution in this solvent mixture of the ethyl cellulose after it has been heated in air at 170° C. for 50 minutes, expressed as a percentage of the viscosity of the ethyl cellulose, before incorporation of the stabiliser and heating, in the form of a 5% solution in the solvent mixture.

*Example 1*

A sample of medium viscosity ethyl cellulose, having a viscosity of about 70 centipoises, was dissolved in the above mentioned solvent mixture. 1% of hydroquinone, based on the weight of the ethyl cellulose, was dissolved in the solution and the solution well stirred, after which the cellulose ether and the stabilising agent were precipitated by mixing the solution into distilled water. The solvent was removed by steam distillation and the cellulose ether separated, washed with distilled water and dried at about 90–100° C. The stability of the ether after treatment was 100%, whereas that of the untreated ethyl cellulose was only 3.5%.

*Example 2*

10 parts by weight of the ethyl cellulose used in Example 1 was boiled in 1000 parts of distilled water containing 0.1 parts of hydroquinone. It was then filtered off, washed with distilled water and dried for 18 hours at 95–100° C. and had a stability of about 98%.

Having described our invention, what we desire to secure by Letters Patent is:

1. A molding or coating composition comprising both an alkyl cellulose in which the alkyl radicles contain from 2 to 6 carbon atoms, the said alkyl cellulose containing at least 2 alkyl radicles for each $C_6H_{10}O_5$ unit and being soluble in hydrophobic organic solvents, and hydroquinone homogeneously distributed therethrough in amount 1%–5% of the weight of the alkyl cellulose.

2. A molding or coating composition comprising both an ethyl cellulose which is soluble in hydrophobic organic solvents and hydroquinone homogeneously distributed therethrough in amount 1%–5% of the weight of the ethyl cellulose.

3. A molding or coating composition comprising both ethyl cellulose which is soluble in hydrophobic organic solvents and which contains at least 2 ethyl radicles for each $C_6H_{10}O_5$ unit and hydroquinone homogeneously distributed therethrough in amount 1%–5% of the weight of the ethyl cellulose.

JOHN HENRY SHARPHOUSE.
JOHN DOWNING.

REFERENCES CITED

The following references are of record in the file of this patent:

UNITED STATES PATENTS

| Number | Name | Date |
|---|---|---|
| 2,160,458 | Gladding | May 30, 1939 |
| 2,207,076 | Spurlin | July 9, 1940 |
| 2,239,753 | Martin | Apr. 29, 1941 |
| 2,320,859 | Foord | June 1, 1943 |
| 2,333,577 | Koch | Nov. 2, 1943 |
| 2,389,370 | Koch | Nov. 20, 1945 |

FOREIGN PATENTS

| Number | Country | Date |
|---|---|---|
| 145,106 | Germany | Oct. 26, 1903 |
| 582,726 | Germany | Aug. 21, 1933 |